United States Patent
Ball et al.

(10) Patent No.: US 10,762,291 B2
(45) Date of Patent: *Sep. 1, 2020

(54) AUTOMATIC TRANSLATION OF SPREADSHEETS INTO SCRIPTS

(71) Applicant: Palantir Technologies Inc., Palo Alto, CA (US)

(72) Inventors: Eliot Ball, London (GB); Dustin Janatpour, San Mateo, CA (US); Nicholas White, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/226,100

(22) Filed: Dec. 19, 2018

(65) Prior Publication Data

US 2019/0121848 A1  Apr. 25, 2019

Related U.S. Application Data

(63) Continuation of application No. 15/658,218, filed on Jul. 24, 2017, now Pat. No. 10,180,934.

(51) Int. Cl.
*G06F 17/00* (2019.01)
*G06F 40/18* (2020.01)
(Continued)

(52) U.S. Cl.
CPC .............. *G06F 40/18* (2020.01); *G06F 8/40* (2013.01); *G06F 8/427* (2013.01); *G06F 40/103* (2020.01); *G06F 40/177* (2020.01); *G06F 40/205* (2020.01)

(58) Field of Classification Search
CPC .................................. G06F 17/246; G06F 8/30
See application file for complete search history.

(56) References Cited

U.S. PATENT DOCUMENTS 5,418,950 A   5/1995 Li et al.
5,428,737 A   6/1995 Li et al.
(Continued)

FOREIGN PATENT DOCUMENTS

DE   102004007638   9/2005
DE   102014103482   9/2014
(Continued)

OTHER PUBLICATIONS

"A Quick Guide to UniProtKB Swiss-Prot & TrEMBL," Sep. 2011, pp. 2.
(Continued)

*Primary Examiner* — Scott T Baderman
*Assistant Examiner* — Barbara M Level
(74) *Attorney, Agent, or Firm* — Sheppard Mullin Richter & Hampton LLP

(57) ABSTRACT

Systems and methods are provided for automatically translating one or more electronic spreadsheets into scripts. One or more electronic spreadsheets containing data arrays and formula arrays may be accessed. The electronic spreadsheet(s) may implement various logic using the data arrays and the formula arrays. The range(s) of the formula arrays may be determined. The range(s) of the data arrays may be determined based on the range(s) of the formula arrays. Conversion ranges may be determined based on the range(s) of formula arrays and the range(s) of data arrays. One or more dependencies between the conversion ranges may be determined and used to generate source code modeling the logic implemented by the electronic spreadsheet(s).

20 Claims, 10 Drawing Sheets

(51) Int. Cl.
*G06F 8/41* (2018.01)
*G06F 8/40* (2018.01)
*G06F 40/103* (2020.01)
*G06F 40/177* (2020.01)
*G06F 40/205* (2020.01)

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,643,613 B2 | 11/2003 | McGee et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,010,779 B2 | 3/2006 | Rubin et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,406,592 B1 | 7/2008 | Polyudov |
| 7,519,589 B2 | 4/2009 | Charnock et al. |
| 7,523,395 B1 | 4/2009 | Namait et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,378,526 B2 | 6/2016 | Sampson |
| 10,180,934 B2 | 1/2019 | Ball et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee et al. |
| 2004/0153837 A1 | 8/2004 | Preston et al. |
| 2004/0193608 A1 | 9/2004 | Gollapudi et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0209085 A1 | 9/2006 | Wong et al. |
| 2006/0271838 A1 | 11/2006 | Carro |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0244508 A1 | 10/2008 | Mantuano et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |

(56) References Cited

U.S. PATENT DOCUMENTS

| | | |
|---|---|---|
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0132927 A1 | 5/2013 | Kraft et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2015/0112641 A1 | 4/2015 | Faraj |
| 2015/0269030 A1 | 9/2015 | Fisher et al. |
| 2016/0026923 A1 | 1/2016 | Erenrich et al. |
| 2016/0253307 A1 | 9/2016 | Kraynak et al. |
| 2016/0342582 A1* | 11/2016 | Hiatt .................. G06F 16/285 |
| 2018/0253413 A1* | 9/2018 | Ball ....................... G06F 8/427 |

FOREIGN PATENT DOCUMENTS

| | | |
|---|---|---|
| EP | 1647908 | 4/2006 |
| EP | 2 634 745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2013/030595 | 3/2013 |

OTHER PUBLICATIONS

"A Tour of Pinboard," <http://pinboard.in/tour> as printed May 15, 2014 in 6 pages.

"The FASTA Program Package," fasta-36.3.4, Mar. 25, 2011, pp. 29.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.

Alur et al., "Chapter 2: IBM InfoSphere DataStage Stages," IBM InfoSphere DataStage Data Flow and Job Design, Jul. 1, 2008, pp. 35-137.

Anonymous, "Frequently Asked Questions about Office Binder 97," http://web.archive.org/web/20100210112922/http://support.microsoft.com/kb/843147 printed Dec. 18, 2006 in 5 pages.

Bae et al., "Partitioning Algorithms for the Computation of Average Iceberg Queries," DaWaK 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, 10 (Oct. 1994) pp. 341-354.

Bogle, Phillip Lee, "Reducing Cross-Domain Call Overhead Using Batched Futures," May 1994, Massachusetts Institute of Technology, pp. 96.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delcher et al., "Identifying Bacterial Genes and Endosymbiont DNA with Glimmer," BioInformatics, vol. 23, No. 6, 2007, pp. 673-679.

Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference New York, 1998, pp. 299-310.

Frantisek et al., "An Architectural View of Distributed Objects and Components in CORBA, Java RMI and COM/DCOM," Software—Concepts & Tools, vol. 19, No. 1, Jun. 1, 1998, pp. 14-28.

Goldstein et al., "Stacks Lazy Threads: Implementing a Fast Parallel Call," Journal of Parallel and Distributed Computing, Jan. 1, 1996, pp. 5-20.

Han et al., "Efficient Computation of Iceberg Cubes with Complex Measures," ACM Sigmod, May 21-24, 2001, pp. 1-12.

Ivanova et al., "An Architecture for Recycling Intermediates in a Column-Store," Proceedings of the 35th Sigmod International Conference on Management of Data, Sigmod '09, Jun. 29, 2009, p. 309.

Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Karp et al., "A Simple Algorithm for Finding Frequent Elements in Streams and Bags," ACM Transactions on Database Systems, vol. 28, No. 1, Mar. 2003, pp. 51Ð55.

Kitts, Paul, "Chapter 14: Genome Assembly and Annotation Process," The NCBI Handbook, Oct. 2002, pp. 1-21.

Leela et al., "On Incorporating Iceberg Queries in Query Processors," Technical Report, TR-2002-01, Database Systems for Advanced Applications Lecture Notes in Computer Science, 2004, vol. 2973.

Liu et al., "Methods for Mining Frequent Items in Data Streams: An Overview," Knowledge and Information Systems, vol. 26, No. 1, Jan. 2011, pp. 1-30.

Madden, Tom, "Chapter 16: The BLAST Sequence Analysis Tool," The NCBI Handbook, Oct. 2002, pp. 1-15.

Mendes et al., "TcruziKB: Enabling Complex Queries for Genomic Data Exploration," IEEE International Conference on Semantic Computing, Aug. 2008, pp. 432-439.

Mizrachi, Ilene, "Chapter 1: Gen Bank: The Nuckeotide Sequence Database," The NCBI Handbook, Oct. 2002, pp. 1-14.

Official Communication for U.S. Appl. No. 15/658,218 dated Sep. 8, 2017.

Official Communication for European Patent Application No. 18158964.9 dated Jul. 26, 2018.

Russell et al., "Nitelight: A Graphical Tool for Semantic Query Construction," 2008, pp. 10.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

Smart et al., "A Visual Approach to Semantic Query Design Using a Web-Based Graphical Query Designer," 16th International Con-

(56) References Cited

OTHER PUBLICATIONS ference on Knowledge Engineering and Knowledge Management (EKAW 2008),ÊAcitrezza, Catania, Italy, Sep. Ê29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.

\* cited by examiner

| | A | B | C |
|---|---|---|---|
| 1 | Raw Data | Derived 1 | Derived 2 |
| 2 | 23 | 1 | -1 |
| 3 | 48 | 2 | 0 |
| 4 | 26 | 3 | 1 |
| 5 | 11 | 27 | 25 |
| 6 | 84 | 42.25 | 40.25 |
| 7 | 25 | 36.5 | 34.5 |
| 8 | 21 | 35.25 | 33.25 |
| 9 | 86 | 54 | 52 |
| 10 | 44 | 43 | 41 |
| 11 | 73 | 72 | 70 |
| 12 | 18 | 17 | 15 |
| 13 | 31 | 30 | 28 |

FIGURE 2A

| | A | B | C |
|---|---|---|---|
| 1 | Raw Data | Derived 1 | Derived 2 |
| 2 | 23 | 1 | =B2-2 |
| 3 | 48 | 2 | =B3-2 |
| 4 | 26 | 3 | =B4-2 |
| 5 | 11 | =AVERAGE(A2:A5) | =B5-2 |
| 6 | 84 | =AVERAGE(A3:A6) | =B6-2 |
| 7 | 25 | =AVERAGE(A4:A7) | =B7-2 |
| 8 | 21 | =AVERAGE(A5:A8) | =B8-2 |
| 9 | 86 | =AVERAGE(A6:A9) | =B9-2 |
| 10 | 44 | =A10-1 | =B10-2 |
| 11 | 73 | =A11-1 | =B11-2 |
| 12 | 18 | =A12-1 | =B12-2 |
| 13 | 31 | =A13-1 | =B13-2 |

| | A | B | C |
|---|---|---|---|
| | Raw Data | Derived 1 | Derived 2 |
| 1 | | | |
| 2 | 23 | 1 | -1 |
| 3 | 48 | 2 | 0 |
| 4 | 26 | 3 | 1 |
| 5 | 11 | 27 | 25 |
| 6 | 84 | 42.25 | 40.25 |
| 7 | 25 | 36.5 | 34.5 |
| 8 | 21 | 35.25 | 33.25 |
| 9 | 86 | 54 | 52 |
| 10 | 44 | 43 | 41 |
| 11 | 73 | 72 | 70 |
| 12 | 18 | 17 | 15 |
| 13 | 31 | 30 | 28 |

FIGURE 2D

| | A | B | C |
|---|---|---|---|
| | Raw Data | Derived 1 | Derived 2 |
| 1 | | | |
| 2 | 23 | 1 | =B2-2 |
| 3 | 48 | 2 | =B3-2 |
| 4 | 26 | 3 | =B4-2 |
| 5 | 11 | =AVERAGE(A2:A5) | =B5-2 |
| 6 | 84 | =AVERAGE(A3:A6) | =B6-2 |
| 7 | 25 | =AVERAGE(A4:A7) | =B7-2 |
| 8 | 21 | =AVERAGE(A5:A8) | =B8-2 |
| 9 | 86 | =AVERAGE(A6:A9) | =B9-2 |
| 10 | 44 | =A10-1 | =B10-2 |
| 11 | 73 | =A11-1 | =B11-2 |
| 12 | 18 | =A12-1 | =B12-2 |
| 13 | 31 | =A13-1 | =B13-2 |

```
310 ─┤  def get_unnamed():
         return pandas.Series([44, 73, 18, 31])

320 ─┤  def get_raw_data():
         return pandas.Series([23, 48, 26, 11, 84, 25, 21, 86])

330 ─┤  def get_derived_1(raw_data, unnamed):
         """
         =AVERAGE(A2:A5)
         =A10-1
         """
         part_0 = pandas.Series([1, 2, 3])
         part_1 = raw_data.rolling(window=4).mean().dropna()
         part_2 = unnamed.sub(1.0)
         return pandas.concat(part_0, part_1, part_2)

340 ─┤  def get_derived_2(derived_1):
         """
         =B2-2
         """
         return derived_1.sub(2.0)
```

FIGURE 3

|   | A | B | C | D | E |
|---|---|---|---|---|---|
| 1 | Year |  | Month | Day | Computed date |
| 2 | 2016 |  | 1 | =C2*$A$5 | =DATE($A2,C2,D2) |
| 3 |  |  | 2 | =C3*$A$5 | =DATE($A2,C3,D3) |
| 4 | Day multiple |  | 3 | =C4*$A$5 | =DATE($A2,C4,D4) |
| 5 | 2 |  | 4 | =C5*$A$5 | =DATE($A2,C5,D5) |
| 6 |  |  | 5 | =C6*$A$5 | =DATE($A2,C6,D6) |
| 7 |  |  | 6 | =C7*$A$5 | =DATE($A2,C7,D7) |
| 8 |  |  | 7 | =C8*$A$5 | =DATE($A2,C8,D8) |
| 9 |  |  | 8 | =C9*$A$5 | =DATE($A2,C9,D9) |

FIGURE 4A

```
def get_month():
    return pandas.Series([1, 2, 3, 4, 5, 6, 7, 8])

def get_day_multiple():
    return 2 def get_year():
    return 2016 def get_day(month, day_multiple):
    """
    =C2*$A$5
    """
    return month.mul(day_multiple)

def get_computed_date(year, month, day):
    """
    =DATE($A$2,C2,D2)
    """
    return pandas.concat(
        [month, day], axis=1).apply(
            lambda x: (datetime.date(int(year), int(x[0]),
            int(x[1])) - datetime.date(1899, 12, 30)).days,
            axis=1)
```

FIGURE 4B

|   | A | B | C | D | E |
|---|---|---|---|---|---|
| 1 | Key | Value | | Lookup Key | Lookup Value |
| 2 | 1 | 34 | | 1 | =VLOOKUP(D2,$A$2:$B$11,2) |
| 3 | 2 | 53 | | 5 | =VLOOKUP(D3,$A$2:$B$11,2) |
| 4 | 3 | 27 | | 3 | =VLOOKUP(D4,$A$2:$B$11,2) |
| 5 | 4 | 52 | | 7 | =VLOOKUP(D5,$A$2:$B$11,2) |
| 6 | 5 | 87 | | 3 | =VLOOKUP(D6,$A$2:$B$11,2) |
| 7 | 6 | 59 | | 5 | =VLOOKUP(D7,$A$2:$B$11,2) |
| 8 | 7 | 31 | | 1 | =VLOOKUP(D8,$A$2:$B$11,2) |
| 9 | 8 | 11 | | 5 | =VLOOKUP(D9,$A$2:$B$11,2) |
| 10 | 9 | 58 | | 9 | =VLOOKUP(D10,$A$2:$B$11,2) |
| 11 | 9 | 54 | | 8 | =VLOOKUP(D11,$A$2:$B$11,2) |

```
def get_lookup_key():
    return pandas.Series([1, 5, 3, 7, 3, 5, 1, 5, 9, 8])

def get_key():
    return pandas.Series([1, 2, 3, 4, 5, 6, 7, 8, 9, 9])

def get_value():
    return pandas.Series([34, 54, 27, 52, 87, 59, 31, 11, 58, 54])

def get_lookup_value(lookup_key, key, value):
    """
    =VLOOKUP(D2,$A$2:$B$11,2)
    """
    return lookup_key.map(lambda x: value[numpy.where(key.values == x)[0][-1]])
```

AUTOMATIC TRANSLATION OF SPREADSHEETS INTO SCRIPTS

CROSS REFERENCE TO RELATED APPLICATIONS

This application is a continuation application of U.S. Ser. No. 15/658,218, filed Jul. 24, 2017, which claims the benefit under 35 U.S.C. § 119(e) of the U.S. Provisional Application Ser. No. 62/466,109, filed Mar. 2, 2017, the content of which is hereby incorporated by reference in its entirety.

FIELD OF THE INVENTION

This disclosure relates to approaches for automatically translating electronic spreadsheets into scripts.

BACKGROUND

Under conventional approaches, users may rely on spreadsheets for storing and modeling data. These spreadsheets may also include formulas for manipulating data. There may be instances in which information included in the spreadsheet needs to be recreated programmatically using scripts.

SUMMARY

Various embodiments of the present disclosure may include systems, methods, and non-transitory computer readable media configured to automatically translate one or more electronic spreadsheets into scripts. One or more electronic spreadsheets containing data array(s) and formula array(s) may be accessed. The electronic spreadsheet(s) may implement various logic using the data array(s) and the formula array(s). The range(s) of the formula array(s) may be determined. The range(s) of the data array(s) may be determined based on the range(s) of the formula array(s). Conversion ranges may be determined based on the range(s) of formula array(s) and the range(s) of data array(s). One or more dependencies between the conversion ranges may be determined and used to generate source code modeling the logic implemented by the electronic spreadsheet(s).

In some embodiments, the formula array(s) may include a single formula array. In some embodiments, the formula array(s) may include a dragged formula array, and the range of the dragged formula array may be determined by diffing pairs of cells in the electronic spreadsheets.

In some embodiments, the range(s) of data arrays may include one or ranges of cells referenced by the formula array(s).

In some embodiments, the systems, methods, and non-transitory computer readable media are further configured to merge two or more ranges of data arrays, two or more ranges of formula arrays, or two or more ranges of data arrays and formula arrays.

In some embodiments, the systems, methods, and non-transitory computer readable media are further configured to determine names for the conversion ranges based on cells containing a string above the conversion ranges.

In some embodiments, the systems, methods, and non-transitory computer readable media are further configured to generate the source code in the Python programming language.

In some embodiments, the systems, methods, and non-transitory computer readable media are further configured to expose the dependencies between the conversion ranges through an interface. The interface may enable a user to modify the dependencies to change the source code to more accurately model the logic implemented by the electronic spreadsheet(s).

In some embodiments, the dependencies may be exposed using a dependency graph defined by the dependencies.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2A illustrates an example electronic spreadsheet, in accordance with various embodiments.

FIG. 2B illustrates example raw data and formulas included in the example electronic spreadsheet shown in FIG. 2A.

FIGS. 2C-2D illustrate example ranges of formula arrays, in accordance with various embodiments.

FIGS. 2E-2G illustrate example ranges of data arrays, in accordance with various embodiments.

FIG. 2H illustrates example conversion ranges, in accordance with various embodiments.

FIG. 3 illustrates example source code translated from the example electronic spreadsheet shown in FIGS. 2A-2B, in accordance with various embodiments.

FIG. 4A illustrates an example electronic spreadsheet, in accordance with various embodiments.

FIG. 4B illustrates example source code translated from the example electronic spreadsheet shown in FIG. 4A, in accordance with various embodiments.

FIG. 4C illustrates an example electronic spreadsheet, in accordance with various embodiments.

FIG. 4D illustrates example source code translated from the example electronic spreadsheet shown in FIG. 4C, in accordance with various embodiments.

DETAILED DESCRIPTION

A claimed solution rooted in computer technology overcomes problems specifically arising in the realm of computer technology. In various implementations, a computing system can automatically translate one or more spreadsheets (e.g., Excel workbook) into an executable script (e.g., Python script). When translating, the computing system can parse the formulas and raw data included in the spreadsheet. The computing system can also determine ranges of formulas and ranges of data stored in the spreadsheet along with their respective dependencies. This information can be used determine dependencies between the ranges. Based on this information, the computing system can generate code that models various logic included in the spreadsheets.

Figure 1:
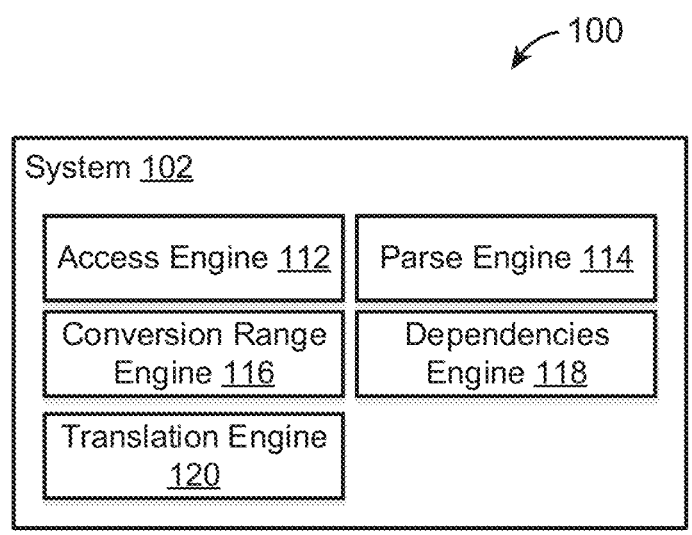
FIG. 1 illustrates an example environment for automatically translating electronic spreadsheets into scripts, in accordance with various embodiments.

FIG. 1 illustrates an example environment 100 for automatically translating electronic spreadsheets into executable scripts, in accordance with various embodiments. The example environment 100 may include a computing system 102. The computing system 102 may include one or more processors and memory. The processor(s) may be configured to perform various operations by interpreting machine-readable instructions stored in the memory. As shown in FIG. 1, in various embodiments, the computing device 102 may include an access engine 112, a parse engine 114, a conversion range engine 116, a dependencies engine 118, a translation engine 120, and/or other engines.

In various embodiments, the access engine 112 is configured to access one or more electronic spreadsheets. The electronic spreadsheet(s) may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system through a network). Cells within the electronic spreadsheet(s) may be referenced by using a cell identifier (e.g., row identifier and column identifier). For example, cells within the electronic spreadsheet(s) may be referenced by respective column and row identifiers. In some embodiments, the access engine 112 may access multiple electronic spreadsheets within an electronic workbook. Cells within multiple electronic spreadsheets may be referenced by using a cell identifier and an electronic spreadsheet identifier. For example, cells within the electronic workbook may be referenced by the respective spreadsheet, column, and row identifiers.

The electronic spreadsheet(s) may contain one or more arrays of data and one or more arrays of formulas. The electronic spreadsheet(s) may implement various logic using the data array(s) and the formula array(s). A logic may refer to a set of arrangement of data and/or formula designed to perform one or more specific tasks. For example, a logic of an electronic spreadsheet may include a set of arrangement of data and formula designed to provide various calculations/predictions based on raw numbers and/or processed numbers. In some embodiments, the formula array(s) may include a single formula array. A single formula array may consist of a single cell within the electronic spreadsheet(s) that includes a formula. In some embodiments, the formula array(s) may include a dragged formula array. A dragged formula array may consist of multiple cells within the electronic spreadsheet(s) that include formulas created by performing a dragging operation on one or more formula cells.

In various embodiments, the parse engine 114 is configured to parse the formulas and the raw data included in the electronic spreadsheet(s). For example, the parse engine 114 may parse the formulas and the raw data included in the electronic spreadsheet(s) and determine that the electronic spreadsheet(s) contain raw numbers within certain ranges of cells, and that the electronic spreadsheet(s) contain formulas within certain ranges of cells. The parse engine 114 may parse the formulas from the raw data by detecting equal signs ("=") within the cells and/or by detecting formulas within the cells (as opposed to detecting only raw numbers and/or raw strings).

The parse engine 114 is configured to determine one or more ranges of formula arrays included in the electronic spreadsheet(s). Range(s) of formula arrays (e.g., dragged formula arrays) may be identified by diffing pairs of cells (e.g., horizontal pairs, vertical pairs) in the electronic spreadsheet(s) and determining where the cells include the same formula with cell references that differ by a value of one. The beginnings and ends of ranges may be identified by diffing pairs of cells (e.g., horizontal pairs, vertical pairs) in the electronic spreadsheet(s) and determining where the cells include different formulas and/or include cell references that do not differ by a value of one. Adjacent cells that include the same formula with cell references that differ by a value of one may be grouped together in the same formula range.

For example, for cells in a column (e.g., column B), the parse engine 114 may compare the formulas and the cell references within adjacent cells to determine whether the cells include the same formula with cell references that differ by a value of one. The first cell having the same formula with a cell reference value that differ by one from an adjacent cell may be identified as the beginning of the formula range. For example, cell B1 may be identified as the beginning of a formula range based on cell B1 including the formula (A1+3) and cell B2 including the formula (A2+3). References within the following pairs of cells may be compared to determine how far the adjacent cells include the same formula with cell references that differ by a value of one (e.g., comparison of cell B2 to cell B3, comparison of cell B3 to cell B4, etc.). The last cell having the same formula with cell references that differ by a value of one with an adjacent cell may be identified as the end of the formula range. For example, cell B2 may be identified as the end of the formula range based on cell B3 including a different formula (e.g., A3−5) or a cell reference that does not differ by a value of one (e.g., C9+3).

The parse engine 114 is configured to determine one or more ranges of data arrays based on the range(s) of formula array(s). Data ranges may include raw data (e.g., raw numbers entered into the electronic spreadsheet(s)) and/or processed data (e.g., processed numbers calculated by the electronic spreadsheet(s)). The parse engine 114 may identify one or more ranges of data arrays based on which cells are referenced by the formula array(s).

In various embodiments, the conversion range engine 116 is configured to determine one or more conversion ranges based on the range(s) of formula array(s) and the range(s) of data array(s). A conversion range may define a grouping of cells which may be grouped together for translation into source code. The conversion range engine 116 may determine one or more conversion ranges by taking a union of range(s) of data arrays and range(s) of formula arrays within the electronic spreadsheet(s). Range(s) of data arrays and range(s) of formula arrays that overlap may be merged into a single conversion range. For example, an array of formula ranges may reference cells D1-D5 and another array of formula ranges may reference cells D3-D9. Based on the overlap in the referenced ranges, the conversion range engine 116 may merge the referenced data ranges (D1-D9) into a single conversion range. In some embodiments, the conversion range engine 116 may merge multiple data ranges that are adjacent to each other into a single conversion range. For example, an array of formula ranges may reference cells D1-D4 and another array of formula ranges may reference cells D5-D7. Based on multiple formula ranges referencing adjacent data ranges, the conversion range engine 116 may merge the adjacent data ranges (D1-D7) into a single conversion range. The conversion range engine 116 may identify as conversion ranges individual data/formula ranges that are not merged with other ranges. The conversion range engine 116 may also identify as conversion ranges merged ranges of data/formula ranges.

In some embodiments, the conversion range engine 116 may be configured to determine names for the conversion ranges. The names for the conversion ranges may be determined based on cells containing a string above the individual conversion ranges. For example, the cell containing the string may be immediately above the conversion range (e.g., adjacent to the conversion range) or not immediately above the conversion range (e.g., not adjacent to the conversion range).

In various embodiments, the dependencies engine 118 is configured to determine one or more dependencies between the conversion ranges. A dependency may refer to a range of cells depending on another range of cells for calculation of its values. One or more dependencies between the conversion ranges may be determined based on formulas included in the conversion ranges. For example, based on a first conversion range including a formula array that references a data range included in a second conversion range, the dependencies engine 118 may determine that the first conversion range depends on the second conversion range. The dependencies engine 118 may create a tree of dependencies (e.g., a dependency graph) based on individual dependencies between the conversion ranges.

In various embodiments, the translation engine 120 is configured to generate source code that models the various logic implemented by the electronic spreadsheet(s). The translation engine 120 may use the dependencies between the conversion ranges to group and translate both the data and the formulas within the electronic spreadsheet(s) into one or more source code. The translation engine 120 may sort the ranges topologically based on the dependencies and recursively translate the formulas into source code. The arrays of data and/or formulas within a conversion range may be translated in groups. In some embodiments, the translation engine 120 may produce a dictionary of linked code objects which may be used as a library for programmatically generating a pipeline. In some embodiments, the translation engine 120 may be configured to generate source code in the Python programming language. Uses of other programming languages are contemplated.

FIG. 2A illustrates an example electronic spreadsheet 200, in accordance with various embodiments. FIG. 2B illustrates raw data and formulas included in the electronic spreadsheet 200. As shown in FIGS. 2A-2B, the electronic spreadsheet 200 includes a column (Column A) titled "Raw Data," a column (Column B) titled "Derived 1," and a column (Column C) titled "Derived 2." The "Raw Data" column includes twelve cells (A2-A13) of raw numbers. The "Derived 1" column includes three cells (B2-B4) of raw numbers of nine cells (B5-B13) of formulas. One or more formulas within cells B5-B9 may have been created using a dragging operation. For example, the formula "=AVERAGE(A2:A5)" may have been entered in cell B5. The formulas in cells B6-B9 may have been created by dragging the formula in cell B5 (or a region corresponding to the cell B5) down to cell B9 (e.g., across cells B6-B9). In one example, a dragging operation may be performed by clicking on a cell using a computer mouse button and dragging the mouse pointer to one or more other cells while holding the button. One or more formulas within cells B10-B13 may also have been created using a dragging operation. For example, the formula "=A10−1" may have been entered in cell B10. The formulas in cells B11-B13 may have been created by dragging the formula in cell B10 (or a region corresponding to the cell B10) down to cell B13 (e.g., across cells B11-B13). The "Derived 2" column includes twelve cells (C2-C13) of formulas. One or more formulas within cells C2-C13 may also have been created using a dragging operation. For example, the formula "=B2−2" may have been entered in cell C2. The formulas in cells C3-C13 may have been created by dragging the formula in cell C2 (or a region corresponding to the cell C2) down to cell C13 (e.g., across cells C3-C13).

Individual formula cells within the electronic spreadsheet 200 typically may not include information that indicates whether the formulas within the cells were created as a single formula or as a dragged formula. Rather, the individual formula cells within the electronic spreadsheet 200 may merely provide the formulas for the individual cells. For example, cell B7 may not include information indicating whether the formula within the cell ("=AVERAGE(A4:A7)") was entered as a single formula was or created using a dragging operation. Thus, the formulas and the raw data included in the electronic spreadsheet 200 may be parsed using the techniques described above to determine that the electronic spreadsheet 200 contains raw numbers within cells A2-A13 and B2-B4 and formulas within cells B5-B13 and C2-C13.

Referring to FIGS. 2C-2D, the ranges of formula arrays in the electronic spreadsheet 200 may be determined to include a formula range 210 (B5-B9), a formula range 220 (B10-B13), and a formula range 230 (C2-C13) based on diffing pairs of cells and determining that the cells include the same formula with cell references that differ by a value of one. For example, referring to the formula range 210 (B5-B9), it may be determined that these cells include the same formula (=AVERAGE(cell reference: cell reference)) with cell references that change by a value of one between cells (A2:A5 to A3:A6, A3:A6 to A4:A7, A4:A7 to A5:A8, A5:A8 to A6:A9). Referring to the formula range 220 (B10-B13), it may be determined that these cells include the same formula (=cell reference-1) with cell references that change by a value of one between cells (A10 to A11, A11 to A12, A12 to A13). Referring to the formula range 230 (C2-C13), it may be determined that these cells include the same formula (=cell reference-2) with cell references that change by a value of one between cells (B2 to B3, B3 to B4, B4 to B5, B5 to B6, B6 to B7, B7 to B8, B8 to B9, B9 to B10, B10 to B11, B11 to B12, B12 to B13).

Figures 2E, 2F, 2G, 2H:
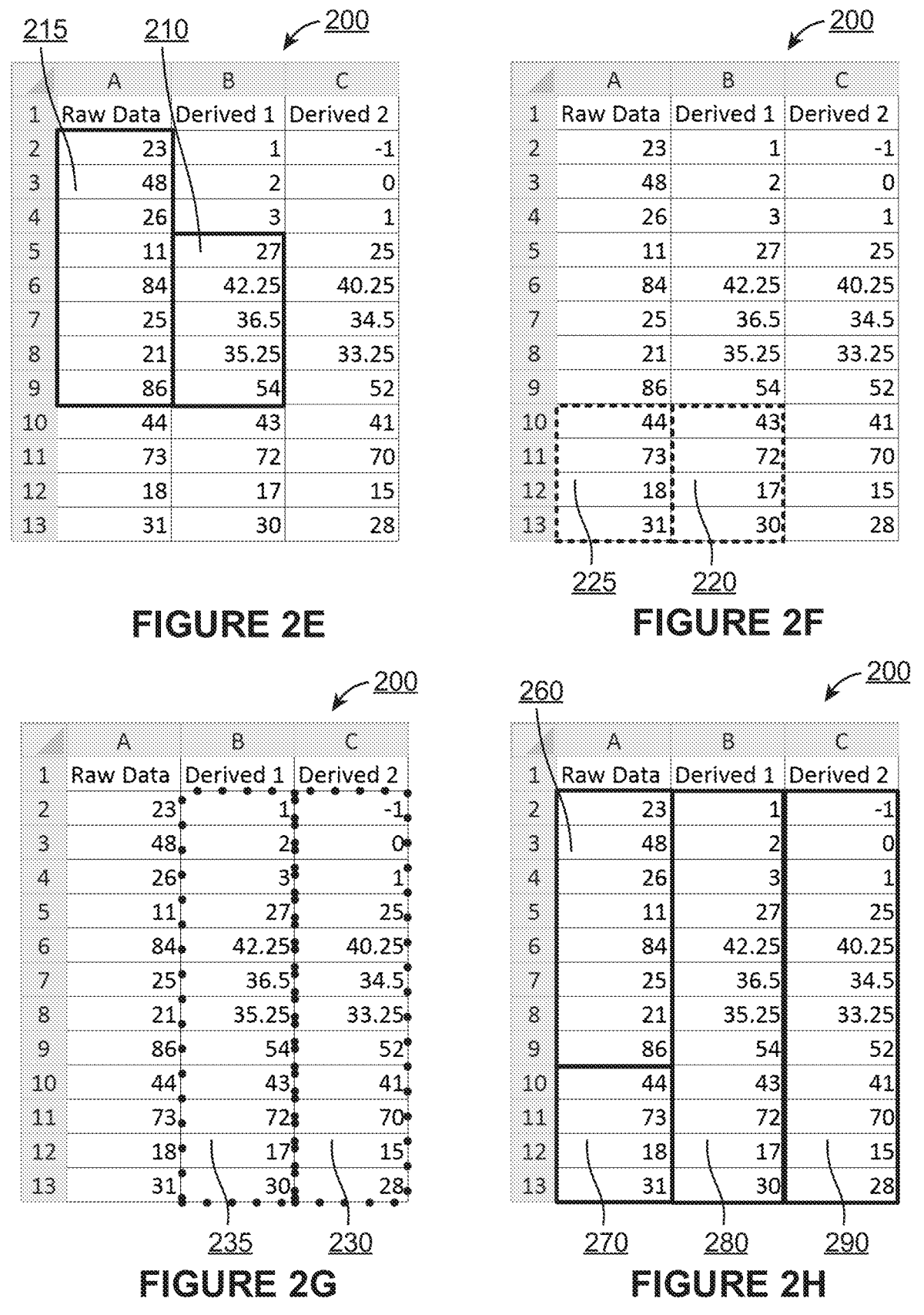

FIGS. 2E-2G illustrate example ranges of data arrays determined based on ranges of formula arrays, in accordance with various embodiments. In FIG. 2E, a data range 215 (A2-A9) may be determined based on the formula range 210 (and the formulas included in the formula range 210). In FIG. 2F, a data range 225 (A10-A13) may be determined based on the formula range 220 (and the formulas included in the formula range 220). In FIG. 2G, a data range 235 (B2-B13) may be determined based on the formula range 230 (and the formulas included in the formula range 230).

FIG. 2H illustrates example conversion ranges determined based on range(s) of formula array(s) and range(s) of data array(s), in accordance with various embodiments. In FIG. 2H, a conversion range 260 may be determined based on the data range 215 (shown in FIG. 2E), a conversion range 270 may be determined based on the data range 225 (shown in FIG. 2F), a conversion range 280 may be determined based on based on the union of the formula range 210 (shown in FIG. 2E), the formula range 220 (shown in FIG. 2F), and the data range 235 (shown in FIG. 2G), and a conversion range 290 may be determined based on the data range 230 (shown in FIG. 2G).

In some embodiments, cells containing strings may be used to determine names for the conversion ranges. For example, the cell (A1) above the conversion range 260 contains the string "Raw Data." This string may be used to determine the name "Raw_Data" or the like for the conversion range 260. The cell above the conversion range 270 does not contain a string and the first cell containing a string (A1) may have been used to determine the name for the conversion range 260. This string may not be used to determine the name for the conversion range 270. Instead, the name "Unnamed" or the like may be determined for the conversion range 270. The cell (B1) above the conversion range 280 contains the string "Derived 1." This string may be used to determine the name "Derived_1" or the like for the conversion range 280. The cell (C1) above the conversion range 290 contains the string "Derived 2." This string may be used to determine the name "Derived_2" or the like for the conversion range 290. Other names and determinations of names for conversion ranges are contemplated.

Figure 2I:
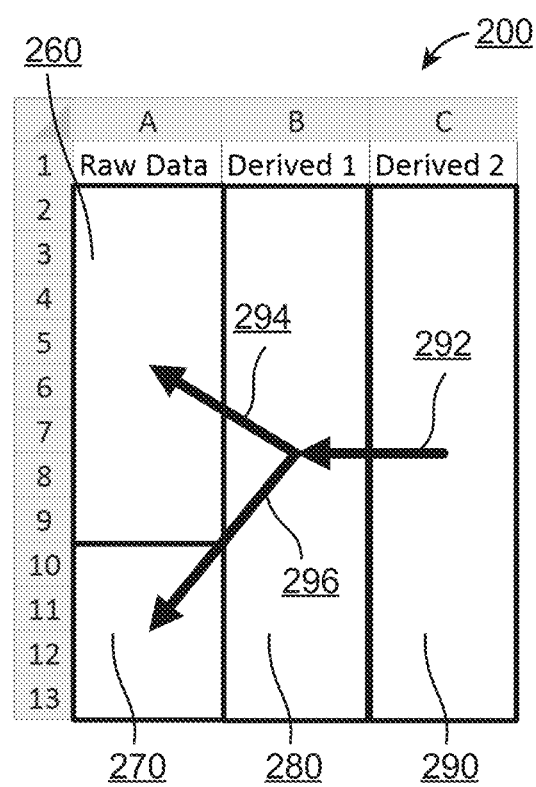
FIG. 2I illustrates example dependencies between conversion ranges, in accordance with various embodiments.

FIG. 2I illustrates example dependencies between conversion ranges, in accordance with various embodiments. Based on the conversion range 290 including the formula array 230 that references the data range 235 included in the conversion range 280, it may be determined that the conversion range 290 depends on the conversion range 280 (indicated by a dependency 292). Based on the conversion range 280 including the formula array 210 that references the data range 215 included in the conversion range 260, it may be determined that the conversion range 280 depends on the conversion range 260 (indicated by a dependency 294). Based on the conversion range 280 including the formula array 220 that references the data range 225 included in the conversion range 270, it may be determined that the conversion range 280 depends on the conversion range 270 (indicated by a dependency 296 shown in FIG. 2I). The dependencies 292, 294, 296 may be used to generate a dependency tree or graph.

For example, FIG. 3 illustrates example source code 300 translated from the example electronic spreadsheet 200. Based on the dependencies 292, 294, 296, the translation engine 120 may order the conversion ranges in the order of the conversion range 270, the conversion range 260, the conversion range 280, and the conversion range 290 for translation. A portion 310 of the source code 300 may correspond to a translation of the conversion range 270. A portion 320 of the source code 300 may correspond to a translation of the conversion range 260. A portion 330 of the source code 300 may correspond to a translation of the conversion range 280. A portion 340 of the source code may correspond to a translation of the conversion range 290. The arguments taken by each function may describe the dependencies between the different functions as determined from the electronic spreadsheet(s). When chained together, the functions may be used to programmatically re-generate the same data as the electronic spreadsheet(s) in an executable script.

FIGS. 4A-4D illustrate other example electronic spreadsheets and source code generated from these electronic spreadsheets, in accordance with various embodiments. FIG. 4A illustrates an example electronic spreadsheet 400, which computes a sequence of dates from a fixed year, a varying month, and a day based on combining the month with a "day multiple" value. The generated source code 410 (shown in FIG. 4B) may implement the logic of the electronic spreadsheet 400 by concatenating the Panda series into a DataFrame and generating a lambda function to apply to each row in the DataFrame. FIG. 4C illustrates an example electronic spreadsheet 420, which performs a VLOOKUP to populate a column. The VLOOKUP may take the last instance of the key in the lookup column to determine the value. The generated source code 430 (shown in FIG. 4D) may implement the look-up logic of the electronic spreadsheet 420.

The generated source code may be integrated directly into a processing pipeline. The raw data in the source code may be replaced with live data sources so that the logic of the source code may be run on values from different data sources, instead of being tied to raw data originally included in the electronic spreadsheet(s). The generated source code may allow a processing pipeline to directly implement the logic of the source code (as implemented by electronic spreadsheet(s)) to transform values from data source(s) instead of relying on importing the values into the electronic spreadsheet(s) and/or obtaining the transformed values from the electronic spreadsheet(s). In some embodiments, the raw data in the source code may be replaced with outputs of other source code and the results of the generated source code may be provided as inputs for other source code.

In some embodiments, the generated source code may not be an exact equivalent to the data/formulas/logic included in the electronic spreadsheet(s). The generated source code may provide a basis for one or more users to complete the translation. One or more users may debug the generated source code to arrive at an equivalent translation more quickly than if the user(s) were to write the source code from scratch to implement the logic of the electronic spreadsheet(s).

In some embodiments, the dependencies between the conversion ranges may be exposed through one or more interfaces. For example, individual functions of the generated source code and/or individual conversion ranges may be represented as a block, with the dependencies defining the relationships between the conversion ranges via directed arrows between the blocks. The directed arrows between the blocks may form a dependency graph defined by the dependencies. The interface may show a graphical version of the logic translated into the source code. The interface may enable a user to modify the dependencies to modify the source code to more accurately model the logic implemented by the electronic spreadsheet(s). For example, a user may fix logic mistakes by changing the dependencies through the interface. As another example, a user may combine or separate dependencies/formulas into one or more functions within the source code. In some embodiments, the interface may enable one or more users to insert user-specific dependencies/formulas for conversion into source code. Other types of changes through the interface are contemplated.

Figure 5:
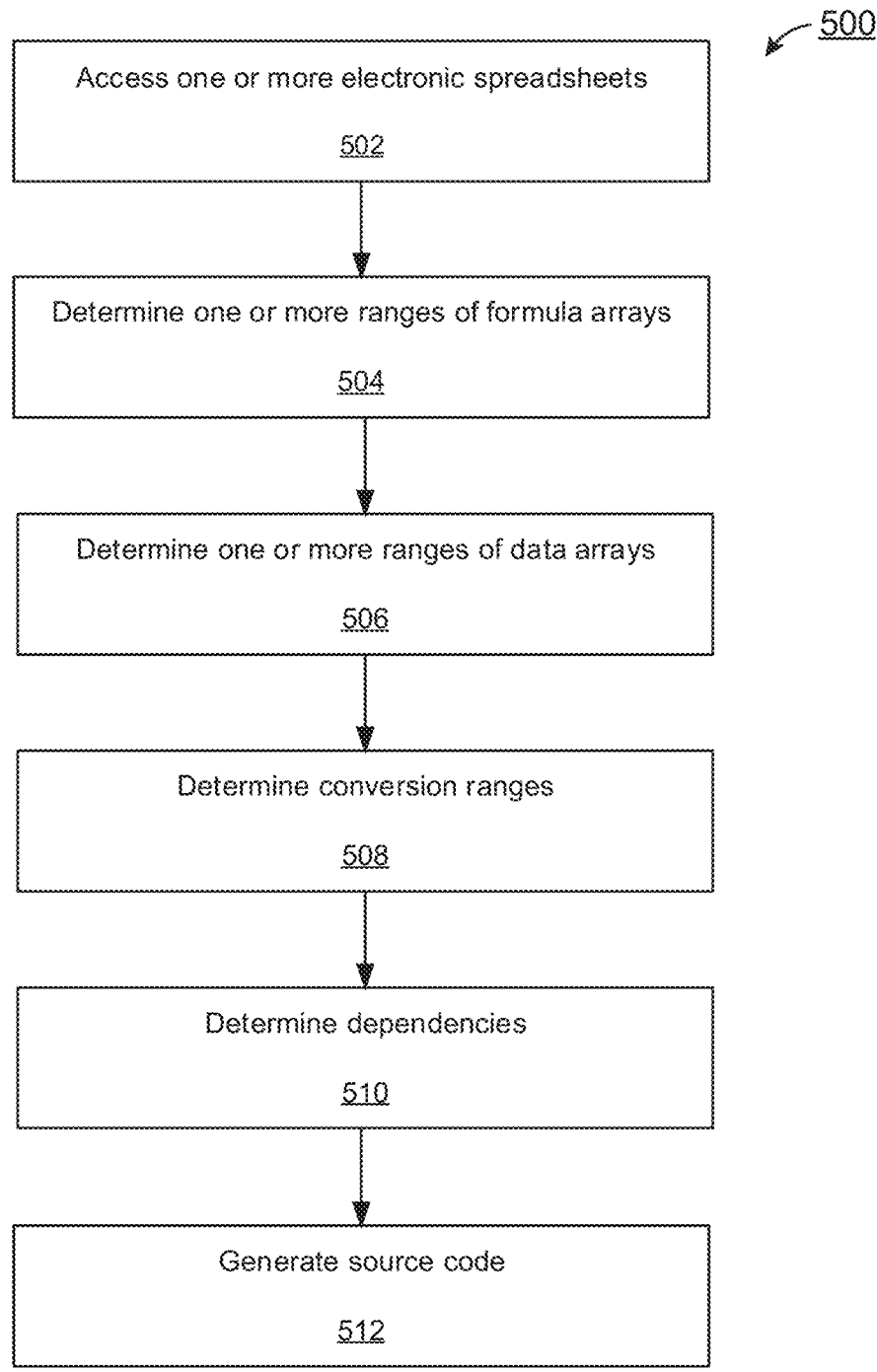
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, one or electronic spreadsheets may be accessed. The electronic spreadsheet(s) may contain one or more data arrays and one or more formula arrays. The electronic spreadsheet(s) may implement various logic using the data array(s) and the formula array(s). At block 504, one or more ranges of formula arrays may be determined. At block 506, one or more ranges of data arrays may be determined. The range(s) of data array(s) may be determined based on the range(s) of formula array(s). At block 508, conversion ranges may be determined. The conversion ranges may be determined based on the range(s) of formula array(s) and the range(s) of data array(s). At block 510, one or more dependencies between the conversion arrays may be determined. At block 512, source code may be generated based on the conversion ranges and the dependencies between the conversion ranges. The source code may model various logic implemented by the electronic spreadsheet(s).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
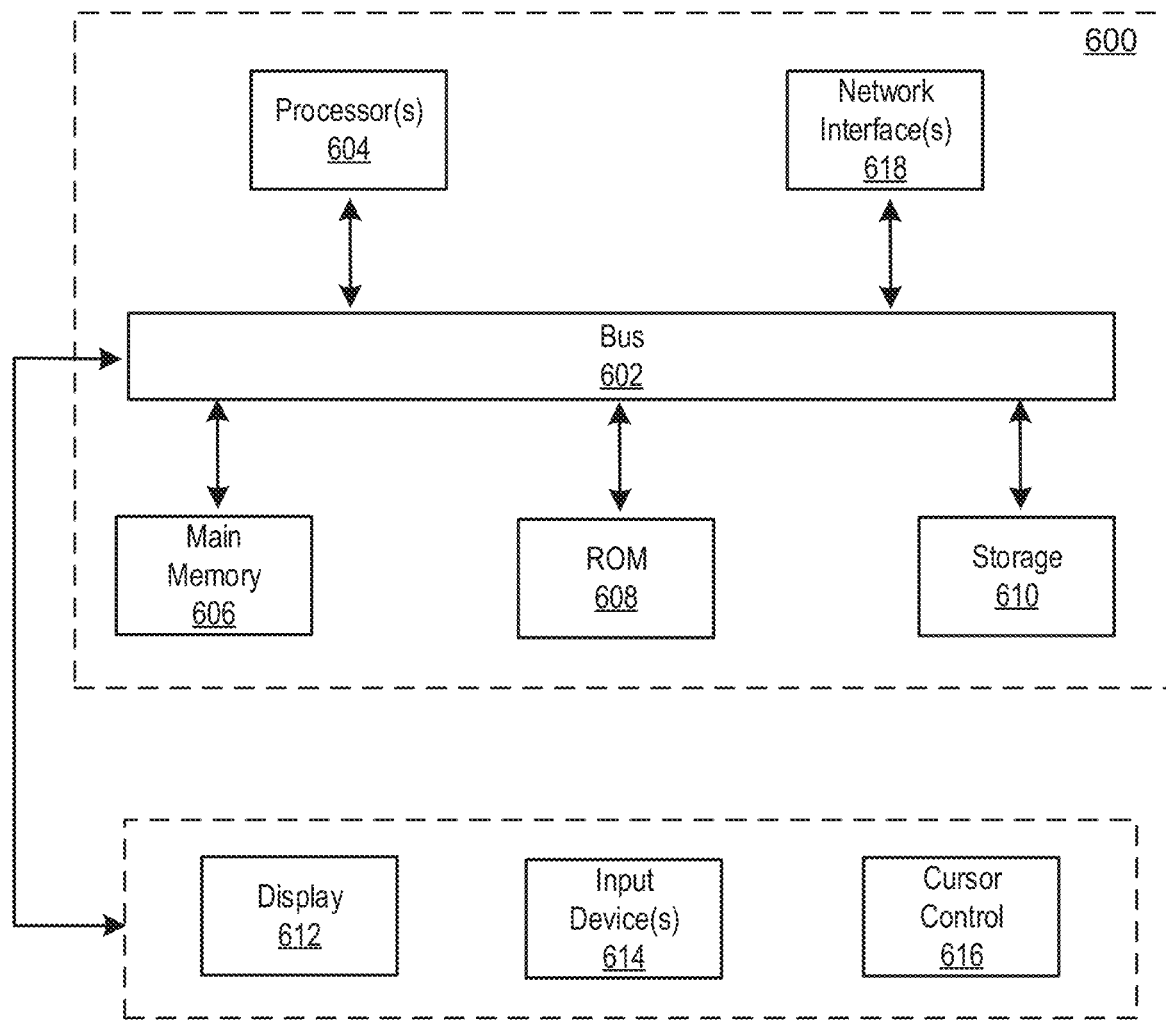
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method being implemented by a computing system including one or more physical processors and storage media storing machine-readable instructions, wherein the method is performed using the one or more processors, the method comprising:

accessing one or more electronic spreadsheets, the one or more electronic spreadsheets containing one or more data arrays and one or more formula arrays, wherein the one or more electronic spreadsheets implement one or more logic using the one or more data arrays and the one or more formula arrays;

determining one or more ranges of the formula arrays;
determining one or more ranges of the data arrays based on the one or more ranges of the formula arrays;
determining conversion ranges based on the one or more ranges of the formula arrays and the one or more ranges of the data arrays;
determining one or more dependencies between the conversion ranges, the determining one or more dependencies further comprising:
determining a first conversion range of the conversion ranges includes a first formula array that references a first data range included in a second conversion range of the conversion ranges;
identifying the first conversion range as depending on the second conversion range based on the first formula array of the first conversion range referencing the first data range of the second conversion range;
creating a dependency graph based at least partially on the dependency of the first conversion range on the second conversion range; and
generating source code based on the conversion ranges and the dependency graph, the source code modeling the one or more logic implemented by the one or more electronic spreadsheets.

2. The method of claim 1, wherein the one or more ranges of the data arrays include one or more ranges of cells referenced by the one or more formula arrays.

3. The method of claim 1, further comprising exposing the one or more dependencies through an interface, wherein the interface enables a user to modify the one or more dependencies to change the source code to more accurately model the one or more logic implemented by the one or more electronic spreadsheets.

4. The method of claim 3, wherein the one or more dependencies are exposed using a dependency graph defined by the one or more dependencies.

5. The method of claim 1, wherein the one or more formula arrays include a dragged formula array and a range of the dragged formula array is determined by diffing pairs of cells in the one or more electronic spreadsheets.

6. The method of claim 1, further comprising merging two or more ranges of the data arrays, two or more ranges of the formula arrays, or two or more ranges of the data arrays and the formula arrays.

7. The method of claim 1, further comprising determining names for the conversion ranges based on cells containing a string above the conversion ranges.

8. The method of claim 1, wherein the source code is formatted in the Python programming language.

9. A system comprising:
one or more physical processors; and
memory storing instructions that, when executed by the one or more physical processors, cause the system to perform:
accessing one or more electronic spreadsheets, the one or more electronic spreadsheets containing one or more data arrays and one or more formula arrays, wherein the one or more electronic spreadsheets implement one or more logic using the one or more data arrays and the one or more formula arrays;
determining one or more ranges of the formula arrays;
determining one or more ranges of the data arrays based on the one or more ranges of the formula arrays;
determining conversion ranges based on the one or more ranges of the formula arrays and the one or more ranges of the data arrays;
determining one or more dependencies between the conversion ranges, the determining one or more dependencies further comprising:
determining a first conversion range of the conversion ranges includes a first formula array that references a first data range included in a second conversion range of the conversion ranges;
identifying the first conversion range as depending on the second conversion range based on the first formula array of the first conversion range referencing the first data range of the second conversion range;
creating a dependency graph based at least partially on the dependency of the first conversion range on the second conversion range; and
generating source code based on the conversion ranges and the dependency graph, the source code modeling the one or more logic implemented by the one or more electronic spreadsheets.

10. The system of claim 9, wherein the one or more ranges of the data arrays include one or more ranges of cells referenced by the one or more formula arrays.

11. The system of claim 9, wherein the instructions further cause the system to perform exposing the one or more dependencies through an interface, wherein the interface enables a user to modify the one or more dependencies to change the source code to more accurately model the one or more logic implemented by the one or more electronic spreadsheets.

12. The system of claim 11, wherein the one or more dependencies are exposed using a dependency graph defined by the one or more dependencies.

13. The system of claim 9, wherein the one or more formula arrays include a dragged formula array and a range of the dragged formula array is determined by diffing pairs of cells in the one or more electronic spreadsheets.

14. The system of claim 9, wherein the instructions further cause the system to perform merging two or more ranges of the data arrays, two or more ranges of the formula arrays, or two or more ranges of the data arrays and the formula arrays.

15. The system of claim 9, wherein the instructions further cause the system to perform determining names for the conversion ranges based on cells containing a string above the conversion ranges.

16. The system of claim 9, wherein the source code is formatted in the Python programming language.

17. A non-transitory computer readable medium comprising instructions that, when executed, cause one or more processors to perform:
accessing one or more electronic spreadsheets, the one or more electronic spreadsheets containing one or more data arrays and one or more formula arrays, wherein the one or more electronic spreadsheets implement one or more logic using the one or more data arrays and the one or more formula arrays;
determining one or more ranges of the formula arrays;
determining one or more ranges of the data arrays based on the one or more ranges of the formula arrays;
determining conversion ranges based on the one or more ranges of the formula arrays and the one or more ranges of the data arrays;
determining one or more dependencies between the conversion ranges, the determining one or more dependencies further comprising:
determining a first conversion range of the conversion ranges includes a first formula array that references a first data range included in a second conversion range of the conversion ranges;

identifying the first conversion range as depending on the second conversion range based on the first formula array of the first conversion range referencing the first data range of the second conversion range;

creating a dependency graph based at least partially on the dependency of the first conversion range on the second conversion range; and generating source code based on the conversion ranges and the dependency graph, the source code modeling the one or more logic implemented by the one or more electronic spreadsheets.

18. The non-transitory computer readable medium of claim 17, wherein the one or more ranges of the data arrays include one or more ranges of cells referenced by the one or more formula arrays.

19. The non-transitory computer readable medium of claim 17, wherein the instructions further cause the one or more processors to perform exposing the one or more dependencies through an interface, wherein the interface enables a user to modify the one or more dependencies to change the source code to more accurately model the one or more logic implemented by the one or more electronic spreadsheets.

20. The non-transitory computer readable medium of claim 19, wherein the one or more dependencies are exposed using a dependency graph defined by the one or more dependencies.

* * * * *